United States Patent
Harper et al.

[15] 3,666,848

[45] May 30, 1972

[54] METHOD OF PRODUCING CLOSED MOLD POLYURETHANE FOAM MOLDINGS FREE OF SURFACE VOIDS BY FLUSHING THE MOLD WITH A VAPORIZED HALOGENATED HYDROCARBON

[72] Inventors: Robert C. Harper, Loveland, Ohio; Cincinnati Milling Machine Company, Cincinnati, Ohio

[22] Filed: Nov. 24, 1969

[21] Appl. No.: 879,507

[52] U.S. Cl...................264/39, 260/2.5 AZ, 260/2.5 BD, 264/48, 264/51, 264/53, 264/85, 264/DIG. 14
[51] Int. Cl.................................................B29d 27/00
[58] Field of Search.............260/2.5 AZ; 264/39, 51, 53, 264/54, 85

[56] References Cited

UNITED STATES PATENTS

| | | | |
|---|---|---|---|
| 3,178,490 | 4/1965 | Petrino | 264/41 |
| 3,182,104 | 5/1965 | Cwik | 264/54 X |
| 3,473,951 | 10/1969 | DeRossi | 260/25 AZ |
| 3,476,841 | 11/1969 | Bienert | 164/48 X |

*Primary Examiner*—Julius Frome
*Assistant Examiner*—Paul Leipold
*Attorney*—Plumley and Tyner

[57] ABSTRACT

Foamed polyurethane moldings free of surface voids and having a substantially uniform skin are formed in a closed mold which has been purged of air with a vaporized liquid halogenated hydrocarbon capable of condensing on the mold walls or dissolving in the molding composition at the temperature and pressure conditions used in molding.

11 Claims, No Drawings

METHOD OF PRODUCING CLOSED MOLD POLYURETHANE FOAM MOLDINGS FREE OF SURFACE VOIDS BY FLUSHING THE MOLD WITH A VAPORIZED HALOGENATED HYDROCARBON

This invention relates to the production of polyurethane foam moldings in a closed mold. More particularly, this invention relates to the production of foam polyurethane moldings produced in a closed mold and having a substantially uniform skin which is void-free.

Foam plastics, especially polyurethane foams, have found increasing use in a variety of applications. For many uses, the cellular surface is either intolerable or undesirable. Methods have been developed, therefore, to produce polyurethane foam moldings having a smooth, dense, surface skin. In one of these methods a closed mold is used. A reactive polyurethane foam composition containing a volatile fluorocarbon blowing agent is charged to the mold, partially filling the mold to the "pour line." The polyurethane mix is allowed to react exothermically, causing a volatilization of the blowing agent and thereby producing a foam which expands to all the previously unfilled portion of the mold above the "pour line." The walls of the mold are maintained at a temperature above that of the original mix but below that of the exotherming polyurethane reaction mix. It is theorized that the lower temperatures at the surface of the mold eliminate or substantially diminish the tendency of the blowing agent to volatilize, therefore causing at the mold-molding interface a thin layer of polyurethane which is not blown and, consequently, resembles a dense layer or skin. Polyurethane moldings are known to be good heat insulators and therefore this cooling and consequent skinning effect occurs primarily at the very outer surfaces. Sections of moldings produced in this manner have been analyzed and have been found to have a dense, thin, outer layer, with the density of the foam decreasing rapidly toward the core.

A problem which has plagued producers of such closed mold polyurethane moldings, however, is the appearance of voids or surface imperfections in those portions of the mold into which the polyurethane mix was expanded, i.e., above the pour line of the liquid polyurethane mix. The problem has been alleviated to some degree by the provision of vent holes, i.e., holes of about one-sixteenth to one-eighth inch in diameter, in the mold. This solution is not entirely satisfactory because sufficient vent holes cannot be provided and because the vent holes cause surface imperfections in the finished molding. Voids and surface imperfections are not generally encountered below the pour line.

Accordingly, it is the general object of this invention to overcome the problems of the prior art and to provide a method for producing closed mold, foam polyurethane moldings having a uniform surface skin.

Another and more particular object of this invention is to provide a method of fabricating foam polyurethane moldings in a closed mold which moldings are free of surface imperfections and voids.

Still further objects of this invention will be apparent from the following disclosure.

Briefly, the method of this invention involves the flushing of the closed mold with a gas capable of condensing on the mold walls or dissolving in the molding composition at the temperature and pressure conditions used in molding. It is desirable that the entire system, including the mold, the mixing chamber, and the pour lines, be flushed with this gas. Any gas with the properties of condensability on the mold walls or solubility in the molding composition at temperatures and pressures employed in molding operations is operative. A gas which is too easily condensable on the surfaces of the mold is not preferred since the condensation would take place before the molding operation. Ideally, a gas which remains in the gaseous form until the pressures of expansion of the molding in the closed mold cause it to condense on the surface of the mold and/or to dissolve in the molding mix is preferred and sought for use in this invention. For instance, it has been found that mold temperatures of about 120° F are particularly suitable. What is desired, therefore, is a gaseous material having an atmospheric boiling point below about 120° F and easily condensable and/or soluble in the mix under the conditions of pressure/temperature which predominate when polyurethane mix is expanded to fill the mold.

In general, original mold temperatures are chosen in relation to process variables especially the composition of the urethane mix. The temperature is below about 250° F, preferably in the range of 110° to 160° F, and below the temperature of the exotherming polyurethane mix. The vapor flushing agent is chosen so that its atmospheric boiling point is less than the original mold temperature to avoid undesirable condensation prior to the expansion of the polyurethane mix.

A number of gases possess the necessary physical characteristics but, although operable, are not considered suitable because they are explosive or are excessively toxic. Halogenated hydrocarbons especially fluorinated hydrocarbons are the preferred materials. Monofluorotrichloromethane is the most preferred gas because it recondenses at desirable temperatures and redissolves best, is non-flammable and non-toxic. Dichlorodifluoromethane and its mixtures with monofluorotrichloromethane are also operable but are not as highly desirable as monofluorotrichloromethane. Methylene chloride is a suitable non-fluoro halogenated hydrocarbon.

Production of foam polyurethane itself is well-known and, accordingly, does not constitute a part of this invention. Urethane polymers are most commonly prepared by reacting a diisocyanate with a hydroxyl-terminated polyether or polyester. Foaming ingredients are added in order to produce a gas which expands polyurethane into a foam. These materials fall into three basic classes. First, water may be added to the polyurethane mix in order to react with the isocyanate to produce free $CO_2$ gas. The second method involves the addition of a finely divided solid material which breaks down or decomposes at the temperature of molding to release a gas. A third, and most preferred, method involves the addition of a liquid which is volatilized at the temperatures of molding. The method of this invention may be applied to moldings which use any of the three methods to accomplish foaming.

The volatile material or "blowing agent" utilized in the last mentioned method may be of any of the materials known in the art. Generally, the volatile materials are organic compounds, preferably halogenated organic compounds and most preferably chlorinated-fluorinated organic materials. Monofluorotrichloromethane and dichlorodifluoromethane each are suitable but a particularly preferred blowing agent comprises a mixture of trichloromonofluoromethane and dichlorodifluoromethane in a weight ratio of from 6:1 to 12:1.

In addition to the foaming method, there are a variety of techniques which can be employed in preparation of polyurethanes. The three basic techniques currently employed are classified as a complete prepolymer, a quasi-prepolymer, and a one-shot system. In the complete prepolymer system, all of the base resin is reacted with polyisocyanate, the system having a slight excess of isocyanate. To this mixture is added an accelerator such as an amine, and the foaming agent. In the quasi-prepolymer system, a portion of the resin is reacted with the isocyanate component with a sufficient excess of isocyanate being employed to react with the remainder of the resin when it is later added along with the amine accelerator and a blowing agent. When the constituents are mixed, they react to produce the urethane linkage, the blowing agent necessary to foam the reactant mass being triggered by the exothermic heat of reaction, or being produced chemically by the interaction of isocyanate with water to produce $CO_2$ gas.

In the one-shot system, there is no prereaction of resin and isocyanate. The method simply involves the mixture at one time of all of the raw materials under very carefully controlled conditions to form a finished foam. The present invention is easily applicable to any of the above-described systems. The examples, however, refer to the quasi-prepolymer method.

Generally, the present invention is utilized in a closed system, i.e., a system comprising a mixing chamber and a closed mold with a means of connecting the mixing chamber and the mold. The mold has a fixed volume and is closable before it has been charged with the polyurethane reaction mix. The mold can be vented in difficult to fill areas. The vents are one-sixteenth to one-eighth inch holes (e.g., three thirty-seconds) drilled through the mold and open to the atmosphere.

The sequence of process steps preferably employed in the present invention is as follows:

1. Flush the closed system (vents open) with a suitable gas in a volume equal to about one to four times the free volume of the closed system,
2. close the system to the atmosphere, (vents open)
3. supply the polyurethane mix components at the proper temperature into the mixing chamber and mix,
4. transfer the polyurethane mix charge to the mold, via the connecting means between the mix chamber and the mold,
5. close the connection between the mix chamber and the mold,
6. allow the polyurethane foam mixture to expand to fill the mold,
7. open the mold and remove the molding.

It is desirable that in the flushing operation, most of the air is removed from the system; i.e., not more than about 5 percent air should remain. The above-indicated volumes of gas necessary to accomplish this purpose reflect amounts which have been found to be satisfactory. It is within the skill of the art to determine the minimum amount of flush gas required.

The invention may be better understood by reference to the following examples, in which all parts and percentages are by weight unless otherwise indicated. These examples are designed to teach those skilled in the art how to practice the invention and to represent the best mode contemplated for carrying out the present invention, and are not intended to limit the scope of the invention in any manner.

EXAMPLE 1

This is a control example and illustrates the preparation of a polyurethane molding without the use of the vapor flushing method of this invention.

The mold selected is one which is particularly difficult to completely fill to produce surface-skinned, void-free polyurethane moldings. The mold is aluminum having a large C-shaped cavity, 505 in.$^3$ in volume, ¾ to 2 inches thick, and about 56 inches from one end to the other along the centerline of the "C," with several small detailed contours near the tips of the arms of the "C."

The urethane mix comprised a weight ratio of 49.5/50.5 of an "A" (polyisocyanate) component and "B" (polyol) component.

The composition of the "A" component in parts by weight was 77.39 Diol A*/Isocyanate A** prepolymer having 25.75 percent free isocyanate
22.61 80/20 mixture of 2,4-, and 2,6-toluene diisocyanate.

* Diol A is a dihydroxy polypropylene glycol of 400 MW.
** Isocyanate A is a crude polymeric diphenyl methane diisocyanate, polymerized through the ortho position via methylene groups with two to five isocyanate groups per molecule.

The composition of the "B" component in parts by weight was 83.7 of a commercially available propoxylated mixture of 75 percent α-methyl glucoside and 25 percent glycerol having 435 hydroxyl number.
1.5 of a commercially available polymeric silicone polyol used as a surfactant.
0.5 N,N,N',N'-tetramethyl-1,3-butanediamine.
14.3 monofluorotrichloromethane.

A commercially available foam mixing machine, provided with a port for flushing the head was used. The A (isocyanate) component was maintained at 120° F, the B component was maintained at 70° F. The mold was positioned with the arms of the "C" pointed downward about 45° from the vertical. The desired amount of mix was poured into the unvented mold, which was at 120°–123° F, at a pour rate of 18.5 lbs/min for 20.8 seconds. The charged mold was allowed to stand for 3 minutes and the molding in the mold cured in an infra-red oven for 30 minutes.

The resulting molding weighed 2,818 g. Blisters up to ¼ inch diameter were noted on the horizontal portion of the "C" molding. Several smaller deeper bubbles were found on the sides of the arms.

EXAMPLE 2

This example illustrates the use of an unvented mold and the vapor flushing of the mix chamber, pour hose and mold cavity in accordance with the process of this invention.

The procedure of Example 1 was repeated (using monofluorotrichloromethane as a flushing agent). The mold was unvented (but not hermetically sealed) and the mix chamber, pour hose and mold cavity were flushed with 140 g of monofluorotrichloromethane vapor in a 30 second flush. At saturated vapor conditions, at atmospheric pressure, this is calculated to be 1,450 in.$^3$ of vapor, or nearly 3 times the 505 in.$^3$ mold volume. The free volume of the remainder of the system is about 10 percent of the mold volume.

A 2,680 g molding was obtained having excellent surface qualities except a 1/16 inch corner void and a few small round bubbles.

Although the invention has been described in considerable detail with reference to certain preferred embodiments thereof, it will be understood that variations and modifications can be effected within the spirit and scope of the invention as described above and as defined in the appended claims.

What is claimed is:

1. A process for the production of foamed polyurethane moldings substantially free of surface voids or flaws comprising the steps of:
   1. providing a fixed volume closed mold at a first mold temperature of from about 110° to about 250° F;
   2. flushing said mold with a vaporized liquid halogenated hydrocarbon in volume equal to about one to four times the free volume of said mold;
   3. partially filling said mold containing said vaporized liquid with a liquid polyurethane molding composition containing a blowing agent, the remainder of said mold remaining filled with an atmosphere consisting of at least 95 percent by volume of the vaporized liquid halogenated hydrocarbon;
   4. expanding said molding composition to fill said mold at a second mold temperature at least as great as said first temperature;
   5. curing said molding composition into a solid foam, and;
   6. recovering the resultant foamed molded product; said vaporized liquid having an atmospheric boiling point below said first mold temperature and being capable of diffusion by condensation and/or solution into the polyurethane at the temperature and pressure conditions existing inside the mold at the mold surfaces during said expanding step.

2. The process of claim 1 in which said first mold temperature is in the range of about 110° to 160° F.

3. The process claim 2 wherein said temperature range is about 125° to 145° F.

4. The process of claim 1 in which said vaporized liquid is selected from the group consisting of trichloromonofluoromethane, dichlorodifluoromethane, mixtures thereof, and methylene chloride.

5. The process of claim 4 in which said vaporized liquid is trichloromonofluoromethane.

6. The process of claim 1 in which said blowing agent is a mixture of trichloromonofluoromethane and dichlorodifluoromethane in a weight ratio of 6:1 to 12:1.

7. A process for the production of foamed polyurethane moldings in a closed mold comprising:
1. providing a closed system comprising a mixing chamber, a fixed volume, closable mold at a first mold temperature of from about 110° to about 250° F, means for interconnecting said mixing chamber and said mold;
2. flushing said closed system with a vaporized liquid halogenated hydrocarbon in volume equal to about one to four times the free volume of said closed system;
3. supplying and mixing in said mixing chamber a liquid polyurethane molding composition containing a blowing agent;
4. transferring via interconnecting means said polyurethane molding composition to said mold to partially fill such mold, the remainder of said mold remaining filled with an atmosphere consisting of at least 95 percent by volume of the vaporized liquid halogenated hydrocarbon;
5. closing said interconnecting means between said mixing chamber and said mold;
6. expanding said molding composition to fill said mold at a second mold temperature at least as great as said first temperature;
7. curing said molding composition into a solid foam, and;
8. recovering the resultant foamed molded product;

said vaporized liquid having an atmospheric boiling point below said first mold temperature and being capable of diffusion by condensation and/or solution into the polyurethane at the temperature and pressure conditions existing inside the mold surfaces during said expanding step.

8. Process of claim 7 wherein the first mold temperature is 110° to 160° F and said vaporized liquid is selected from the group consisting of trichloromonofluoromethane, dichlorodifluoromethane, mixtures thereof and methylene chloride.

9. The process of claim 7 in which said vaporized liquid is selected from the group consisting of trichloromonofluoromethane, dichlorodifluoromethane, mixtures thereof and methylene chloride.

10. The process of claim 7 wherein said blowing agent is a mixture of trichloromonofluoromethane and dichlorodifluoromethane in a weight ratio of 6:1 to 12:1.

11. The process of claim 7 in which said first temperature of said mold is in the range of about 125° to 145° F.

* * * * *